Jan. 12, 1960 J. L. SLONNEGER 2,920,486
DIAPHRAGM ASSEMBLY
Filed Sept. 29, 1954
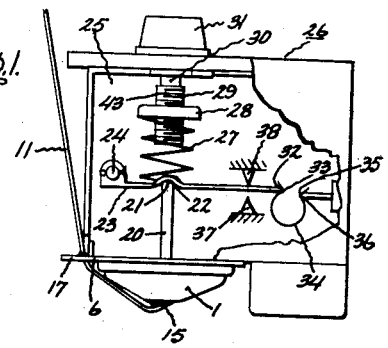
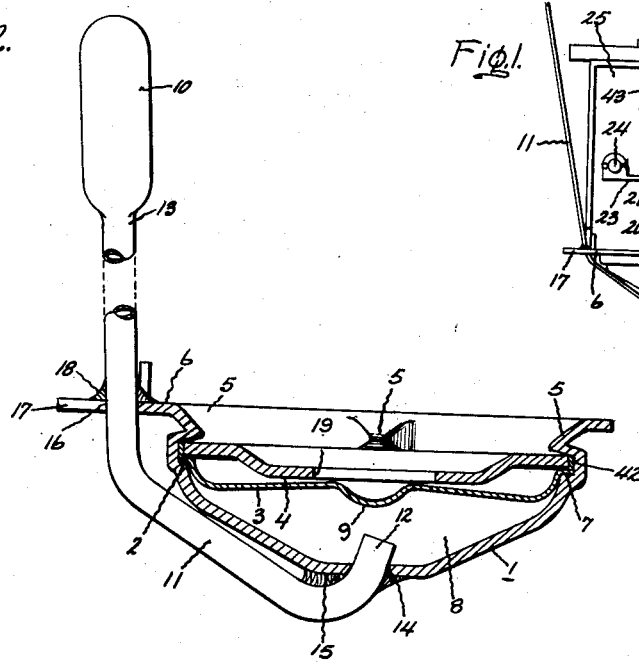
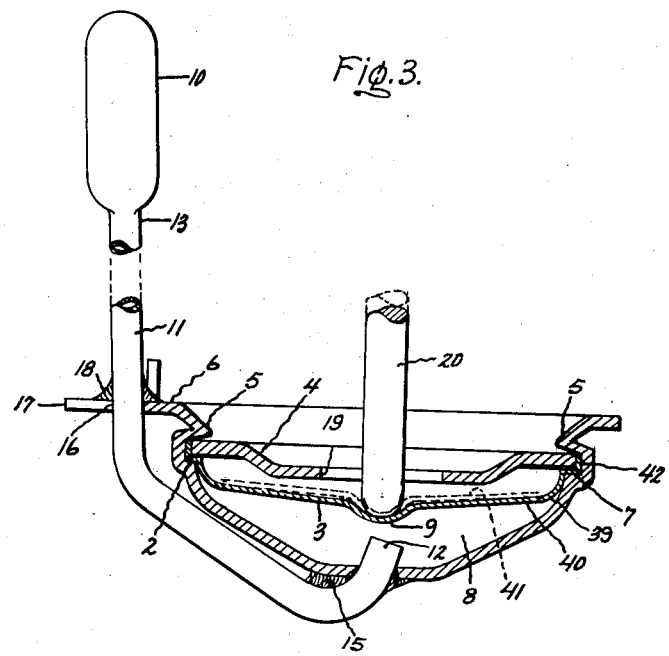
Inventor:
John L. Slonneger,
by Robert G. Iris
His Attorney.

United States Patent Office 2,920,486
Patented Jan. 12, 1960

2,920,486

DIAPHRAGM ASSEMBLY

John L. Slonneger, Morrison, Ill., assignor to General Electric Company, a corporation of New York Application September 29, 1954, Serial No. 459,003

4 Claims. (Cl. 73—378.3)

This invention relates to apparatus operable by pressure changes, and more particularly to a diaphragm assembly for use in such apparatus.

There are many applications where it is necessary to actuate a mechanism or machine in response to temperature changes at a remote location. A method frequently used to accomplish this result, particularly in the field of refrigeration, is a unit consisting of a bellows, or diaphragm, and a tube filled with a gas or vapor and having one end located where the temperature changes are to be sensed. As the fluid pressure increases or decreases in response to a rise or fall in the temperature, the chosen apparatus will be actuated accordingly. It is common knowledge that metal diaphragms are among the most economical means which will respond to the pressure changes in the desired manner. A prime requisite in apparatus of this type is that motion, preferably of the snap action type, be imparted through a fixed stroke to the mechanism by a fixed pressure change. This is particularly true where a diaphragm is used to actuate electrical apparatus of some type, such as a pair of contacts.

In the past, it has been found difficult to use a diaphragm which would give the desired action upon a small pressure change at both high and low level pressures. The diaphragm when used at higher pressures would frequently stretch and thereby destroy the accurate calibration which is necessary in such mechanisms. In order to obtain deflection of the diaphragm with a very small pressure change under both high and low level pressure conditions, it is most desirable to build a low spring rate into the diaphragm without, of course, sacrificing the strength, durability and economy required.

Experimentation has shown that a low spring rate, whether it be positive or negative, is a prime requisite for optimum functioning of such a diaphragm assembly. By low spring rate, it is meant that the pressure required to deflect the diaphragm a predetermined amount will change only slightly between the normal position of the diaphragm and its most extended operative position in any direction. When the spring rate is positive, the pressure required to move the diaphragm a unit of distance increases with the increase in deflection of the diaphragm, whereas when the spring rate is negative the pressure required decreases as the deflection of the diaphragm increases. It is an inescapable fact that the material of which the diaphragm is formed will have the characteristic of a positive spring rate. It will be seen, therefore, that, if the diaphragm is given a shape which has the basic feature of providing a negative spring rate for the diaphragm, the positive spring rate of the material and the negative spring rate brought about by the shape will substantially cancel each other. Thus, if such a shape is provided it becomes possible to produce large quantities of diaphragms with the allowance of relatively large tolerances, since diaphragms having negative spring rates, positive spring rates and zero spring rates will all be satisfactory so long as the positive and negative spring rates substantially cancel each other out to provide a low spring rate.

It will further be seen that it is desirable to maintain the deflection of the diaphragm during its use well within the possible limits of deflection since, as the diaphragm approaches its deflection limits, stretching occurs which vastly increases the spring rate and destroys the calibration of the assembly. When provisions such as those described above are made it is merely necessary to provide an easily adjustable assembly, so that each assembly may be individually calibrated to cause the diaphragm associated therewith to deflect at a standard temperature in response to a standard pressure change, and that this may be done without undue attention and consequent expense to the manufacture of the diaphragm itself.

In addition, by variation of its shape, the diaphragm may be given any desired net positive or negative spring rate up to a positive maximum of the spring rate of the material itself. Such a feature is of high value where the diaphragm is part of an assembly, and it is desired that the net spring rate of the whole assembly be made to approach zero; in such a case, the diaphragm spring rate may be made to offset the spring rate of the remainder of the assembly.

It is, therefore, an object of this invention to provide an improved diaphragm assembly which will include the desirable features set forth above.

Further objects and advantages of this invention will become apparent and the invention will be better understood by references to the following description and the accompanying drawing, and the features of novelty which characterize this invention will be pointed out with particularity in the claims annexed to and forming a part of this specification.

This invention, in one embodiment thereof, provides a cup-shaped member whose opening is closed by a diaphragm which is so shaped and biased that in its operative positions it will present a convex surface to the area within the enclosure formed by the cup and by the diaphragm. The diaphragm will preferably be operative to extreme positions which are both well within the possible deflection limits of the diaphragm. An additional convexity may be formed in the center of the diaphragm to provide a recess on the outer surface so as to locate a member which will transmit motion and force between the diaphragm and the mechanism it is arranged to actuate. It is frequently desirable to provide in the mechanism limit stops which will limit the movement of the diaphragm, and adjustable biasing means which will under ordinary operating circumstances bias the diaphragm to a position a small distance past its dead center position. Means are provided to cause the pressure of a fluid within the enclosure to vary in accordance with a value, such as a temperature, which is to be the controlling factor. The shape of the diaphragm will cause this pressure to act against all surfaces of the diaphragm to force it upwardly and thereby force up the motion transmitting member and actuate the mechanism.

In the drawing,

Figure 1 is a side view, partly cut away, of a control mechanism incorporating the improved diaphragm assembly of this invention;

Figure 2 is an enlarged side view, partly in cross-section, of the improved diaphragm assembly before its incorporation into the control mechanism; and Figure 3 is an enlarged fragmentary side view, partly in cross-section, of the improved diaphragm assembly when in use.

Referring now to Figure 2 of the drawing, there is shown a cup-shaped member, generally indicated at 1, with an annular recess 2 formed on its inner surface; a diaphragm 3 and a washer 4 are maintained in position with respect to cup 1 by a plurality of indentations 5 formed in flange 6 of the cup and by an annular ring 42 of solder which is flowed into recess 2 above flange 7 of the diaphragm and around the periphery of washer 4. It will, of course, be understood that the means for holding diaphragm 3 and washer 4 within recess 2, while preferred, are not prerequisite of this invention and that other securing means may be utilized to equal advantage without departing from the scope of this invention.

Diaphragm 3, as seen in Figure 2, is in a completely unbiased position, just as it was formed during production. The diaphragm is provided with a small centrally located convexity 9 for a purpose to be hereinafter explained. A tube 11 is provided with one end 12 opening into enclosure 8, formed by member 1 and diaphragm 3, and the other end 13 closed and formed into a bulb-like structure 10. Tube 11 and enclosure 8 are filled with a gas or vapor which, when heated, tends to expand and in so doing increases the pressure within enclosure 8 which is, of course, made subject to the variations in pressure because of open end 12 of tube 11 within the enclosure. Bulb 10 of tube 11 is generally arranged to be subject to changes in a control value, such as, for instance, temperatures which will vary the pressure inside enclosure 8 and in turn control the operation of the complete mechanism, as will be explained below. Tube 11 may be formed so as to enter cup 1 through opening 14 therein. The tube may be secured to the cup at this opening, as at 15, either by brazing, soldering, or any other preferred method. Since this is a pressure operated system, it will be apparent that the joint of tube 11 with cup 1 must be thoroughly leak-proof. In order to give tube 11 added rigidity it is preferably passed through an opening 16 provided in an extension 17 of flange 6 of cup 1. As indicated by the numeral 18, the tube may also be soldered or brazed to extension 17 at that point.

Central portion 19 of washer 4 is located in close proximity with diaphragm 3 in its completely unstressed position. This provision is made so that an assembly may be stored over a protracted period of time without any damage to the diaphragm resulting therefrom. Mechanisms of this type are frequently used for refrigerator cold controls, and therefore, the normal storing temperature, unless refrigeration is provided, will be considerably above those in which the assembly will normally operate. Higher temperatures will result in a higher pressure within enclosure 8 and since no means of biasing daiphragm 9 has yet been provided, the pressure within enclosure 8 will force the diaphragm upwardly, part 19 of washer 4 will limit the upward movement of diaphragm 3 so that no matter what the storage temperature, diaphragm will not be stretched to the limits of its deflection and thereby damaged.

Referring to Figures 1 and 3 of the drawing, the structure and shape of the assembly will be described. Seated in convexity 9 is a rod member 20 which, at its upper end 21, is seated in a recessed part 22 of a lever member 23 pivotable about a pin 24 which may be secured to the housing 25 of a control mechanism, generally indicated at 26. Such a control may, for instance, be utilized to control the operation of a refrigerator compressor (not shown). A helical spring 27 is seated between lever 23 and a member 28 which is threadedly mounted on member 29. Member 29 is rigidly secured by an extension 30 to a manually operable knob 31 positioned externally to housing 25, and is provided with a threaded portion 43. It will be seen that rotation of knob 31 will cause member 28 to move up or down on threaded portion 43 of member 29 to modify the pressure of spring 27 on lever 23. End 32 of lever 23 abuts against a pivot surface 33 of a toggle spring 34 which is pivoted at 35 against part 36 of housing 25. In the position shown in Figure 1 helical spring 27 exerts a downward force and toggle spring 34 and rod 20 exert an upward force on lever 23. The downward movement of lever 23 is limited by a stop member 37 secured to housing 25, while the upward movement of the lever is limited by a stop member 38, also so secured. The spring 27 in exerting a downward force on lever 23, of course, also applies a downward force to the rod 20.

Referring now to Figure 3 in particular, it will be noted that the pressure transmitted through rod 20 to diaphragm 3 biases the diaphragm so that it presents a substantially convex surface to the interior of enclosure 8 thereby to prevent a tendency to stretch when the pressure in enclosure 8 increases. The position of the diaphragm 3, as shown in Figure 3, is that normally assumed by the diaphragm during operation when the downward force of spring 27 exceeds the upward force of toggle spring 34 and diaphragm 3 and the upward pressure within enclosure 8 so that lever 23 rests against bottom stop 37. When the lever 23 is in this position rod 20 biases diaphragm 3 to the position shown by the numeral 40 in Figure 3, and the diaphragm presents a convex surface to enclosure 8, as explained above. The convex shape offsets the spring rate inherent in the material of the diaphragm so that the spring rate of the diaphragm may be either positive or negative, but in either case, in the instant embodiment, will be very low. Whichever the spring rate of the diaphragm be, toggle spring 34 and spring 27 may be so adjusted that lever 23 will snap up against stop 38 at any predetermined temperature when the pressure in enclosure 8 overcomes the summation of all other forces acting on lever 23. When lever 23 snaps against stop 38, diaphragm 3 will snap up to the position shown at 41 by the dotted outline retaining its convex surface with respect to enclosure 8.

When the temperature about bulb 10 goes down a predetermined number of degrees (determined by the setting of toggle spring 34) below that required to snap the diaphragm 3 up to position 41, lever 23 will snap back down to stop 37 to return diaphragm 3 to the position shown at 40. The differential between the temperature required to snap the diaphragm 3 upwardly and to snap it back down is achieved by the well known characteristic of toggle mechanisms, such as lever 23 and spring 34 that the force required to start movement in one direction is greater than the force to maintain movement.

It will be seen that the present invention provides a diaphragm assembly which is economical insofar as the manufacture is concerned because the manufacturing tolerances may be made large enough to permit cumulative spring rates which may be either positive or negative. It will further be seen that this is achieved by providing the diaphragm 3 with a convex surface presented to enclosure 8 so that the inherently negative spring rate of the convex surface will substatnially offset the inherently positive spring rate of the material of the diaphragm. It will further be seen, by reference to the two operative extreme positions of diaphragm 3 in Figure 3, that the diaphragm retains this convex surface at all times when in use. The snap action desirable in mechanisms of this type is present and the construction is simple and sturdy so that the assembly will remain calibrated over long periods of time and extensive use. Any differences in spring rate between diaphragm assemblies may be easily and simply adjusted by the combined toggle and spring assembly or any other equivalent mechanism. It will, of course, be understood that the difference between positions 40 and 41 in Figure 3 is a relatively small one, and that the diaphragm is prevented by stops 37 and 38 from approaching the limits of its deflection in order to avoid undue wear and destruction of accurate calibration.

It will also be understood that the spring biasing means and the linkage mechanisms shown are for purposes of illustration, and that the improved diaphragm assembly may be utilized to full advantage regardless of the means used to position it and the means used to transmit its motion. It will further be clear that, if desired, the improved diaphragm assembly may be provided with a net negative spring rate, as hereinbefore described. Also, while the present embodiment shows a specific arrangement for varying the pressure within enclosure 8, it will be apparent that other pressure varying means may be used with equal success.

While this invention has been explained by describing a particular embodiment thereof, it will be apparent that improvements and modifications may be made without departing from the scope of the invention as defined in the appended claims.

What I claim as new and desire to secure by Letters Patent of the United States is:

1. Pressure actuated control apparatus comprising a cup-shaped member, a diaphragm forming an enclosure with said cup-shaped member and having an unstressed position with its central portion elevated, spring biased means mechanically depressing the central portion of said diaphragm to a stressed position presenting a convex surface to said enclosure, means for varying the pressure of a fluid contained within said enclosure thereby to flex said diaphragm, and stop means for limiting the maximum upward flexure of said depressed diaphragm to a second stressed position presenting a convex surface to said enclosure and considerably short of said unstressed position.

2. The pressure actuated control apparatus of claim 1 wherein said diaphragm is depressed to a stressed position in which the inherent negative spring rate due to said convex surface configuration compensates at least in part for the inherent positive spring rate of the diaphragm material whereby the effective spring rate of the diaphragm is very low throughout the region of flexure permitted by said stop means.

3. Pressure actuated control apparatus comprising a cup-shaped member, a metal diaphragm forming an enclosure with said cup-shaped member and having an unstressed position with its central portion elevated, a temperature responsive fluid within said enclosure, a member seated on the central portion of said diaphragm, spring means acting on said seated member for depressing said diaphragm to a stressed position presenting a convex surface to said enclosure in which stressed position said diaphragm has a very low spring rate, and stop means cooperating with said seated member for limiting the maximum upward flexure of said diaphragm to a second stressed position retaining said convex surface.

4. Pressure actuated control apparatus comprising a cup-shaped member, a metal diaphragm forming an enclosure with said cup-shaped member and having an unstressed position with its central portion elevated, an operating lever, mechanical linkage between said lever and said diaphragm, a first spring means for depressing the central portion of said diaphragm to a stressed position presenting a convex surface to said enclosure in which stressed position said diaphragm has a very low spring rate, means for varying the pressure of a fluid contained within said enclosure thereby to flex said diaphragm, stop means limiting the movement of said lever to limit the maximum upward flexure of said diaphragm to a second stressed position retaining said convex surface, and a second spring means for moving said lever rapidly to the limit provided by said stop means.

References Cited in the file of this patent

UNITED STATES PATENTS

| | | |
|---|---|---|
| 478,688 | Clark | July 12, 1892 |
| 909,818 | Stewart | Jan. 12, 1909 |
| 1,781,287 | Levy (Mayo) | Nov. 11, 1930 |
| 1,819,947 | Sensaud De Lavaud | Aug. 18, 1931 |
| 1,910,322 | Coffin et al. | May 23, 1933 |
| 1,976,843 | Eskin | Oct. 16, 1934 |
| 2,103,214 | Coffin | Dec. 21, 1937 |
| 2,203,841 | Persons | June 11, 1940 |
| 2,241,571 | Anderson | May 13, 1941 |
| 2,331,464 | Fillo | Oct. 12, 1943 |
| 2,506,937 | Pawelsky et al. | May 9, 1950 |
| 2,697,448 | Gates | Dec. 21, 1954 |